Jan. 5, 1965 M. F. KOENIG 3,164,752
MULTI-CIRCUIT PANELBOARD FOR CIRCUIT BREAKERS
Filed July 29, 1960 6 Sheets-Sheet 1

Fig. 1

Inventor
Martin F. Koenig
By H R Rather
Attorney

Jan. 5, 1965 M. F. KOENIG 3,164,752
MULTI-CIRCUIT PANELBOARD FOR CIRCUIT BREAKERS
Filed July 29, 1960 6 Sheets-Sheet 2

Inventor
Martin F. Koenig
By H R Rather
Attorney

Jan. 5, 1965   M. F. KOENIG   3,164,752
MULTI-CIRCUIT PANELBOARD FOR CIRCUIT BREAKERS
Filed July 29, 1960   6 Sheets-Sheet 3
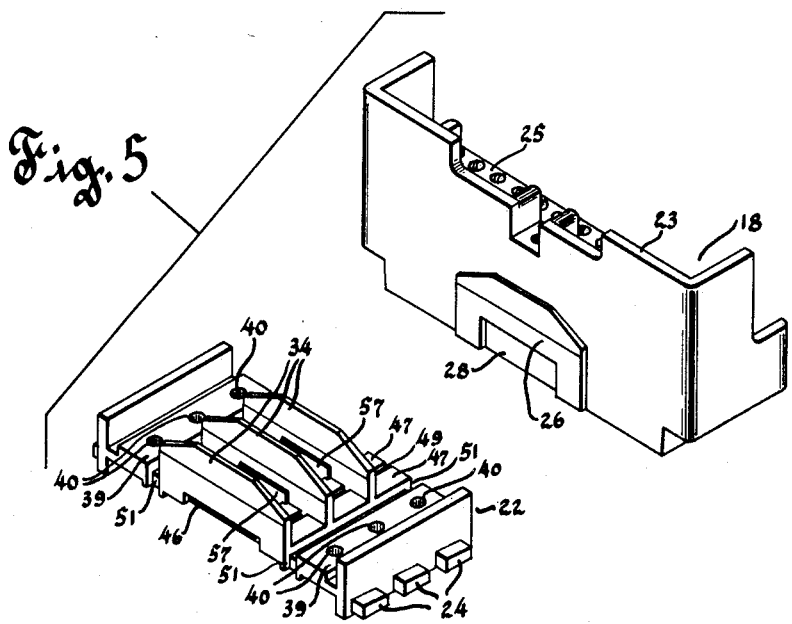
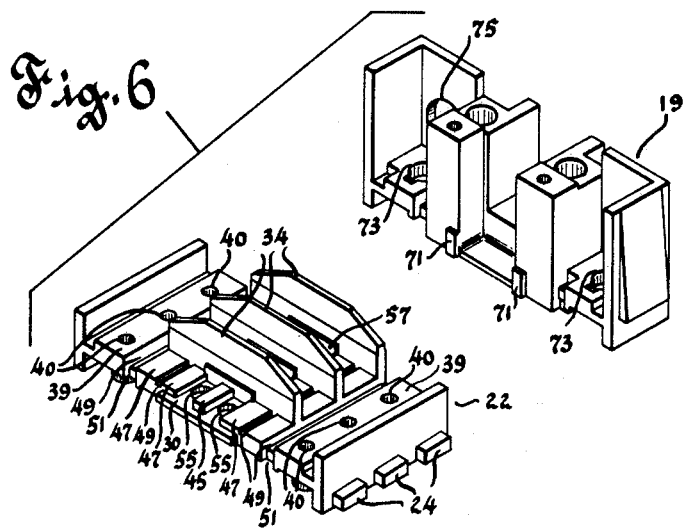
Inventor
Martin F. Koenig
By H. R. Rather
Attorney

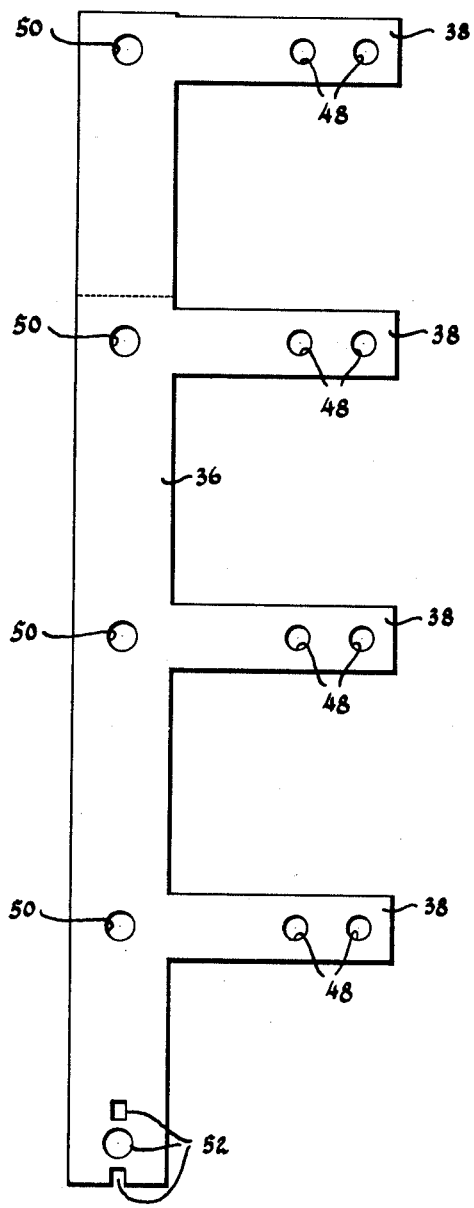
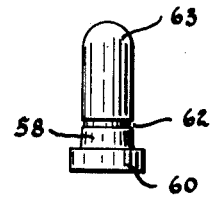
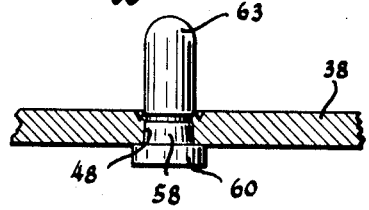
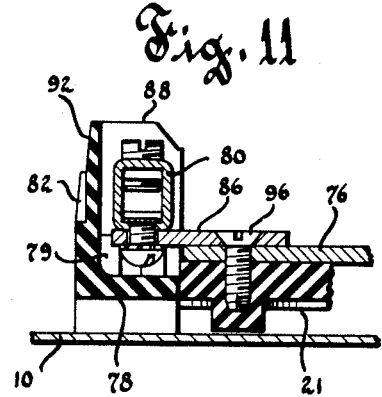

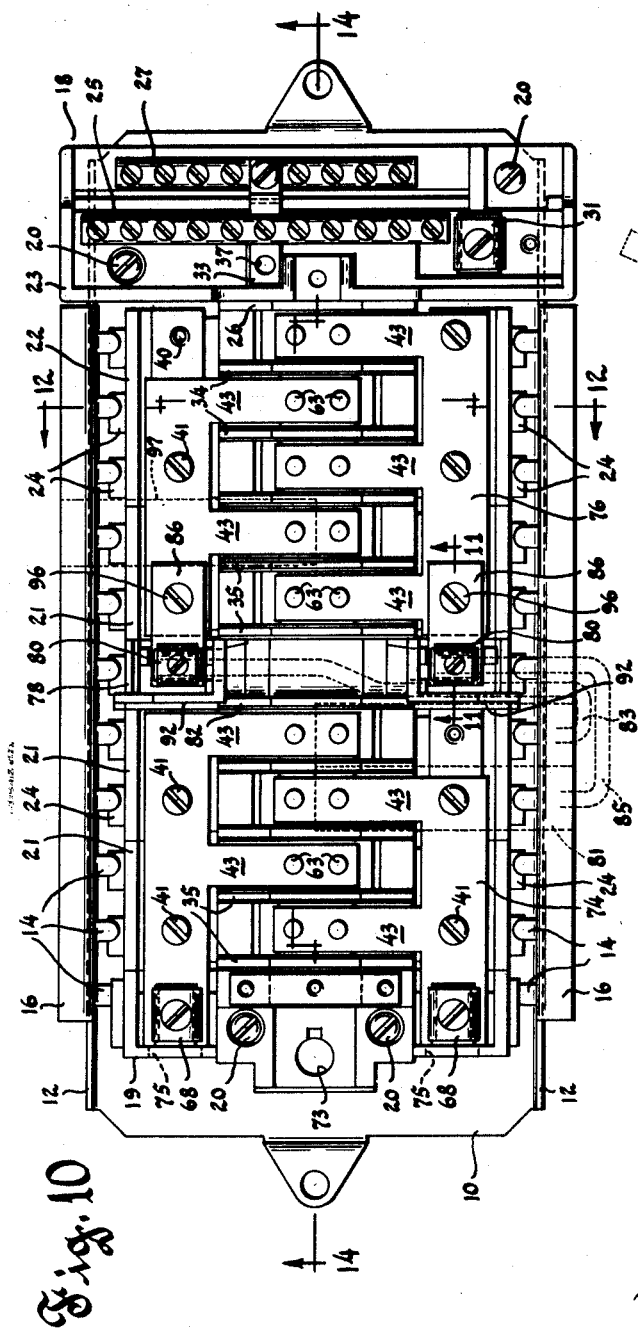
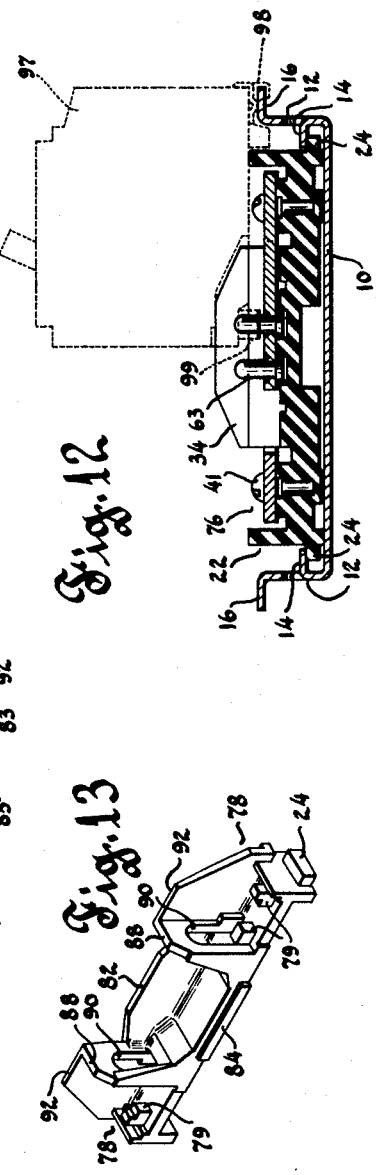

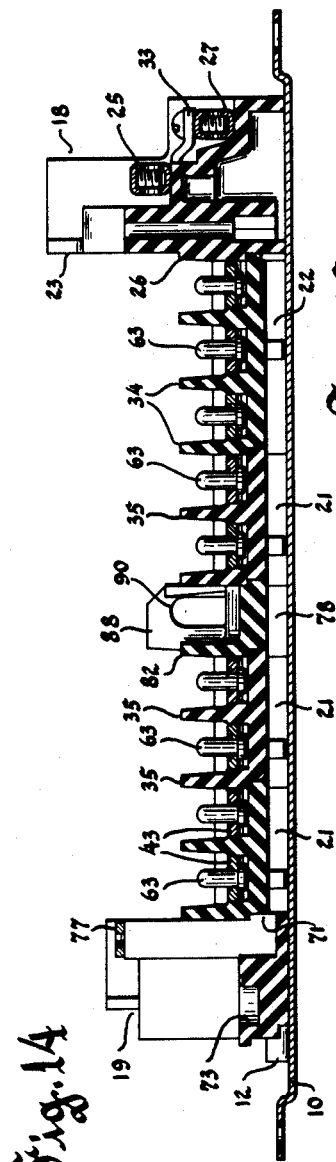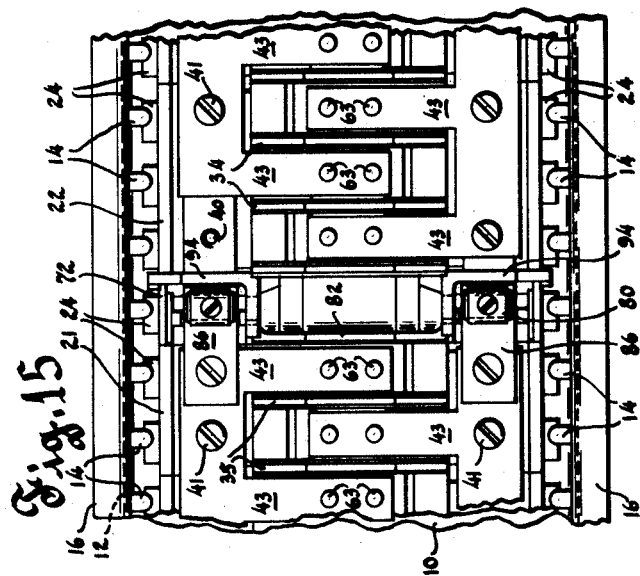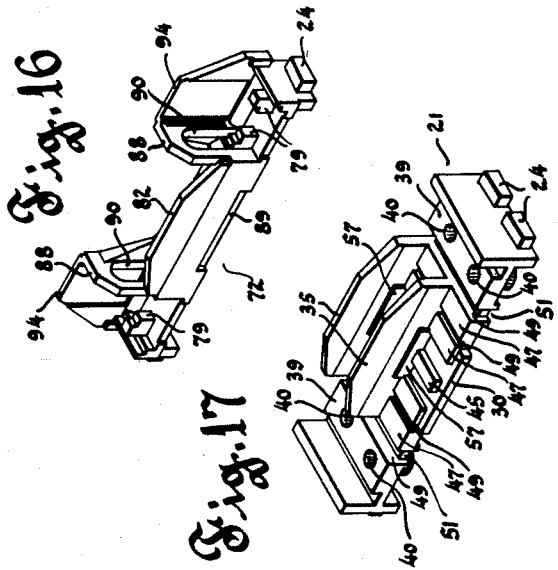

United States Patent Office 3,164,752
Patented Jan. 5, 1965

3,164,752
MULTI-CIRCUIT PANELBOARD FOR CIRCUIT BREAKERS
Martin F. Koenig, Milwaukee, Wis., assignor to Cutler-Hammer, Inc., Milwaukee, Wis., a corporation of Delaware
Filed July 29, 1960, Ser. No. 46,248
2 Claims. (Cl. 317—119)

This invention relates to a multi-circuit panelboard which is adapted to accommodate a number of circuit breakers of the plug-in type in a variety of arrangements.

Circuit breaker panelboards are ordinarily designed to handle a given number of circuits and a change in the number of circuits required may necessitate: a different mould for forming the insulative member of the panel; a change in bus bar design; a rearrangement of terminals on the bus bar; and/or any combination of these and other factors material in the design of a panelboard. When split bussing is required or when three phase current is to be employed the above enumerated difficulties are compounded.

The main object of this invention is to provide a panelboard which is constructed from a few basic components which may be arranged to make a panelboard having a selected number of circuits, using split bussing, and/or employing three phase or single phase current connections.

A second object is to provide a basic panelboard component for mounting and insulating bus bars which are of minimum size and yet provides the required electrical spacing between such bus bars.

A third object is to provide such a panelboard construction in which the current path from the bus bar to the circuit breaker has fewer electrical joints than exist in common panelboard constructions.

The first object is accomplished by using a standard base plate on which may be readily assembled in a unitized panel insulating blocks of various sizes and types. These blocks include: a line terminal block designed to house line terminals and the bus bar ends on which they are mounted for either two wire or three wire input; a ground terminal block which supports and houses various arrangements of ground terminals including neutral wire terminals; at least two types of intermediate bus bar and circuit breaker supporting blocks, some for three and some for two pairs of circuit breakers; and a split bus partition block adapted to house and shield split bus bar terminals when split bus bars are used. Each intermediate block has flat raised areas on which bus bars of varying lengths following a standard design are secured and spaced vertical walls which act as supports for the circuit breakers as well as insulating barriers between terminal pins for the circuit breakers and the fingers projecting outwardly from the bus bars in the spaces between such walls on which such pins are mounted. While intermediate blocks may each have as many vertical walls (spaces) as desired only two wall and three wall units are needed to construct a panelboard line. A panelboard having a minimum of two spaces (4 terminals) would use a two space block and a panelboard having as many more spaces as needed may be fabricated from such two and three space blocks. The split bus partition block also has a vertical wall which acts the same as that of the intermediate block. All the blocks have interlocking tongue and notch means to maintain proper alinement and the intermediate blocks have bottom recesses accommodating a central lower bus bar used with a three phase panel. The intermediate blocks and split bus bar partition block also have projections fitting under tabs on the base plate to hold them in place. If a split bus panel is desired shorter bus bars of standard design are used and the split bus partition block is inserted between the two sets of intermediate blocks which support each set of split bus bars. This block shields the split bus bar terminals by which one set of split bus bars may be connected in the circuit when desired. Depending upon the use of the underlying third bus bar the panel may be three line wire (three phase) or two line wire input. Thus a variety of panel arrangements and numbers of circuits can be easily and cheaply constructed from a minimum of basic components.

The second object is accomplished by providing the upper surface of intermediate blocks with symmetrically arranged ribs and adjacent grooves which elongate the over-surface spacing between the flat areas to which the bus bars are secured. This also includes openings at the ends of certain grooves communicating with the lower surface of the block which also elongate such over-surface spacing particularly in split bus arrangements. Of course, the height of the vertical walls is also designed to provide the required over-surface, and through air spacing.

The third object is accomplished by cutting the selected bus bar from a strip having a main body with spaced fingers projecting laterally from an edge thereof. There obviously are no electrical joints between the bus bar body and the fingers integral therewith. Specially designed circuit breaker terminal (pins) are inserted through holes in these fingers, driven into place from one side, and then staked to the terminal from the other side to effect a cold weld between the terminal and finger. This construction provides a current path through the bus bar between the line terminal and circuit breaker terminals which is freer from electrical joints than presently available panelboard bus bars of comparable cost.

A better understanding of the foregoing features of the invention will be had by referring to embodiments thereof illustrated in the accompanying drawings, in which:

FIGURE 1 is a top plan view of a three-phase panelboard constructed in accordance with the present invention;

FIG. 5 is an exploded perspective view of a ground terminal end block and a three-space intermediate block;

FIG. 6 is an exploded perspective view of a line terminal end block and a three-space intermediate block;

FIG. 7 is an enlarged top plan view of one size of a bus bar of standardized design;

FIG. 8 is an enlarged view of a terminal pin to which a circuit breaker is connected;

FIG. 9 is a side view of such terminal pin assembled to a bus bar;

FIG. 10 is a top plan view of a single-phase panelboard constructed in accordance with the present invention and having a split bus arrangement including a split bus partition block, the use of two circuit breakers connected in tandem with connections required to connect and disconnect the second split bus bank being illustrated by broken lines;

FIG. 11 is a fragmentary enlarged sectional view taken on line 11—11 of FIG. 10;

FIG. 12 is a sectional view taken on line 12—12 of FIG. 10, the manner of mounting a circuit breaker in a stall or space on the panel is illustrated in broken lines;

FIG. 13 is a perspective view of a split bus partition block having the housings for the split bus terminals opening toward the ground terminal block end;

FIG. 14 is a sectional view taken on line 14—14 in FIG. 10;

FIG. 15 is a fragmentary top view of a panelboard incorporating a split bus partition block having the housings for the split bus terminals opening toward the line terminal block end;

FIG. 16 is a perspective view of the partition block shown in FIG. 15; and

FIG. 17 is a perspective view of a two space intermediate block.

Figure 2:
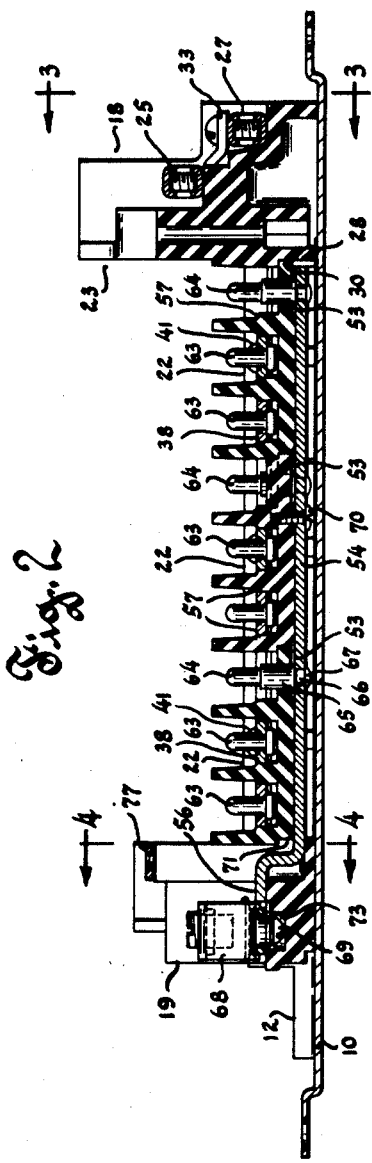
FIG. 2 is a sectional view taken on line 2—2 in FIG. 1.
Figure 3:
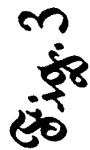
FIG. 3 is a sectional end view taken on line 3—3 of FIG. 2 showing the ground terminal block end of the panelboard.
Figure 4:
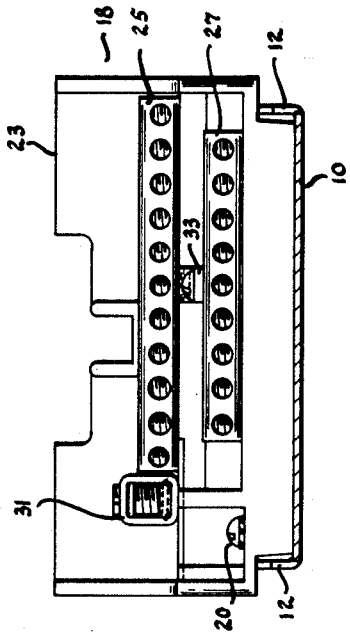
FIG. 4 is a sectional view taken on line 4—4 in FIG. 2 showing the line terminal block end of the panelboard.
Figure 4:
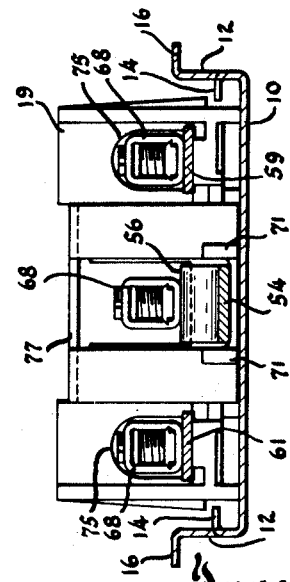

Referring to the drawings, there are shown two basic embodiments of panelboard arrangement. The embodiment illustrated in FIGS. 1 to 4, inclusive, is a so-called three-phase panelboard which can be used with a four wire system. It has 18 circuits or spaces for circuit breakers. To such a panel there can be connected: 120 volt branch lighting circuits between any one of the phase buses and a neutral wire; single or three phase motors using 208 or 240 volts; and many other combinations. The embodiment illustrated in FIGS. 10 and 15 is a so-called single phase panelboard, which can be used on a three wire system and which also incorporates a split bus arrangement. This type of panelboard is used only where current is supplied at 120/240 volts. However, the essence of this invention is present in both embodiments, namely, the use of standardized insulating blocks and standardized design of bus bars to build up the desired number and arrangement of circuits and circuit breaker supports.

This specification will now proceed with a description of the common components used in constructing these various panelboards. Such components, as will be pointed out, vary in some respects such as length of bus bars, number of spaces or stalls in an intermediate block, and the length of the standardized form of base plate. Where possible, the same reference numeral is used to indicate a component or an element of a component which is identical in shape, size and function, no matter what the panelboard arrangement in which it is used.

A metal base plate 10 is common to all panelboards. It varies only in length and each size has the same upwardly bent longitudinal sides 12 from which spaced tabs 14 are struck inwardly to overlie the bottom of the plate in spaced relation thereto to hold the intermediate blocks to the panelboard. The spacing of the tabs is such as to permit a series of intermediate blocks to be lifted from the base plate after a small amount of lateral sliding. A pair of rails 16 extend laterally outward from the sides 12 and form part of the lock by which the circuit breakers are held in place (see FIG. 12). As is customary the base plate has means to mount it in a box or other receptacle.

Another common component is to ground terminal block 18 (see FIGS. 1, 2, 5, 10 and 15). This block has a wall 23 which separates the circuit breaker mounting space from the ground terminals such as the groups of terminals indicated at 25 and 27. The number of terminals in such groups varies with the number of circuits or circuit breaker stalls employed in the panelboard. Also mounted on this block is a neutral wire terminal 31 which may be used in the four wire system of three phase panelboard. Provision may be made for grounding the terminal groups on this block to the base plate 10 by a screw (not shown) passing through a connector plate 33 and down through an opening 37 and threaded in the base plate 10. As is most clearly seen in FIG. 5 the circuit breaker side of wall 23 has a projection 26 which is shaped identical to the vertical walls of the intermediate blocks so that it provides a rest or support for a circuit breaker in the same manner as shown in FIG. 12. This projection is recessed at 28 to form the female part of the interlock for the adjacent intermediate block. The ground terminal block is secured in proper place on the base plate 10 by screws 20 threaded into openings in such plate.

The next common component used in forming the panelboard is the intermediate insulating blocks for supporting and shielding (including proper through air and oversurface spacing) the bus bars and the circuit breaker connecting terminal pins. There are two sizes illustrated. In the embodiment shown in FIGS. 1 to 4 there are three blocks 22 (see FIGS. 5 and 6) each having three spaced vertical walls 34 shaped as shown to support three circuit breakers in the manner illustrated in FIG. 12 and to provide insulating barriers and electrical spacing for the finger portions of the bus bars with the terminal pins. The only difference between the intermediate block 22 of FIGS. 5 and 6 and the intermediate block 21 shown in FIGS. 10, 14 and 17 is that the latter has only two spaced vertical walls 35 (identical in size and shape with wall 34) to provide spaces or stalls for two pairs of circuit breakers. Each intermediate block has projections 24 on its ends which are spaced proportionately with the spacings of tabs 14 so that such projections underlie such tabs to hold the blocks against the base plate. However, by sliding the blocks one tab width a block or a set of blocks may be laterally withdrawn from the base plate. Each intermediate block also has at opposite ends flat areas 39 provided with holes 40 of proper size to be self-tapped. These holes are located opposite each end of a circuit breaker stall. These blocks further have centrally positioned raised flat lands 45. The areas 39 and lands 45 flatly support the main body and lateral fingers of the bus bars which are held in place by screws 41 which are self-tapping in selected holes 40. An important feature of these blocks is the provision on the upper of a series of symmetrically arranged alternately disposed ribs 47 and grooves 49. The purpose of these is to increase the over-surface spacing between the supporting land 45 on which a finger of one bus bar rests and the flat area 39 on which the main body of another bus bar rests so that the spaced required by standards of safety design is obtained within minimum straight line distances thus keeping down the over-all width of the intermediate blocks. The ends of grooves 49 adjacent the ends of the vertical walls 34 and 35 are notched to provide openings 51 communicating between the upper and lower surfaces of the intermediate blocks. These openings also increase the over-surface spacing between adjacent split bus bars. As can be seen in FIG. 2, the bottom of the intermediate blocks 22 at the edge facing the ground terminal end has a shallow recess 53 and holes 55 extend from such recess to the top surface of the block (see FIG. 6). These holes accommodate the circuit breaker terminal pin on the center underlying bus bar while such recess also provides mechanical clearance for terminal pin head 60. The side of each intermediate block facing the ground terminal block has a tongue or projection 30 which fits into the recess or female part 28 of such ground terminal block or into a similarly shaped recess 46 on that side of each intermediate block facing the line terminal end of the panelboard. This interlocking of the intermediate blocks assures proper end-to-end (sidewise of the panel) alinement and assists in registering the holes 40 for the insertion of the self-tapping screws 41 for fastening the bus bars. Another feature in alining and slightly spacing (side-to-side) adjacent intermediate blocks is the provision of bus bar finger engaging projections 57 on the walls 34 and 35. Since the bus bars can be cut to close tolerances and the insulating blocks can not be moulded to such to such close tolerances this feature permit the bus bar fingers to establish such proper side-to-side (end-to-end of the panel) spacing of the intermediate blocks rather than relying on side-to-side contact of the more inaccurately dimensioned blocks for such positioning.

In the three phase arrangement of FIGS. 1 to 4, inclusive, three of the three space blocks 22 are used, however, if a different number of circuits were desired one or more of the two space blocks 21 could be substituted or added.

There are two basic kinds of bus bars, the two outer upper or overlying bus bars and the center or underlying bus bar. The upper bus bars are made in two designs; one for two wire (see FIG. 7). Each design may be of varying length. Both are preferably cut from a preformed strip of conductive metal, such as copper or an alloy thereof. As shown in FIG. 7 this strip for the three phase design has an elongated main body 36 from one side of which at uniformly spaced interval integral fingers 38 extend. The spacing of the fingers is accurately determined and corresponds generally with the spacing of the stalls or circuit breaker spaces of assembled intermediate blocks; there being a finger every third space on the three phase design and a finger for every second space for the two wire design. In the two wire design the fingers, although of identical shape and size, are indicated by reference numeral 43. The fingers of both designs each have spaced holes 48 for the mounting of the circuit breaker connecting terminal pins. In the three phase design of FIG. 7 the main body 36 has holes 50 for mounting the bus bar spaced opposite each finger 38. In the two wire design the holes for mounting the bus bars are in some cases opposite the fingers 43 and in other cases between the fingers. In both designs of the upper bus bar there are line terminal mounting ends which are about one stall long or about two stalls long. One long end bus bar 59 is positioned opposite a short end bus bar 61 so that the fingers will properly alternate and mesh. The line terminal ends of each overlying design as well as the line terminal end of the underlying bus bar have key type openings indicated generally at 52 through which a screw is inserted from below to hold a wire receiving terminal fixed against relative rotation. The underlying or central bus bar 54 used in the three phase system has its line terminal end 56 offset upwardly to extend to an upper surface in the line terminal end block. This bar has no fingers and is made from bar stock, the main body has a pair of transversely spaced holes (not numbered) positioned longitudinally every third stall. These holes are in alinement with the holes 55 in the intermediate blocks 22 when the bar is properly assembled. This bar also has holes through which mounting screws pass to secure the bar to the under side of the intermediate blocks. The fingers 38 and 43 both support terminal pins 63 on which the circuit breakers are frictionally mounted for electrical connection. Each terminal pin (see FIG. 8) has a tapered portion 58 adjacent a head 60 so that when the pin is inserted in a finger as shown in FIG. 9, a wedge fit obtains between the tapered portion of the pin and the finger. To further secure the pin to the finger, pin head 60 is rested on an anvil and a swagging tool is driven into the metal of the finger forcing such metal into a groove 62 in the pin to complete a very tight connection between the terminal pin and bus bar finger thereby providing a very efficient electrical connection. The terminal pins 64 mounted on the central bus bar 54 vary slightly in construction from the pins 63. They are, of course, longer and have an enlarged shank 65 which rests on the bar 54 with a reduced neck 66 press fitted in the transversely spaced holes in such bar. The outer ends of such necks are pressed or spun over as at 67 to make tight connection between such pins and bus bar to provide an efficient electrical joint.

Once the number of circuits is selected, the proper intermediate blocks are arranged with their projections 30 interfitted in adjacent recesses 46. Proper length upper bus bars (such as 59 and 61) and lower bus bar (such as 54) are then selected. A line wire receiving terminal 68 is then fastened by a screw 69 to each line terminal end of the bus bars (such as 59, 61 and 54). The upper bus bars are placed on the supporting surfaces 39 and 45 with the fingers 38 between the projections 57 to lengthwise space the blocks. When the self-tapping screws 41 have been put in place the bus bars and blocks form a unit. The lower bus bar 54 is then secured by a screw 70 to the underside of the blocks with its terminals 64 projecting through the holes 55. This unit is then ready for the application of a line terminal block 19.

The line terminal block 19 (see FIGS. 4 and 6) may be used in both embodiments although there may be slight changes in style with certain arrangements to save assembly cost when different circuit breaker holding bars are used. In all events this block has a pair of projections 71 on its inner face which fit into the recess 46 of the adjacent intermediate block to aline such block and the line terminal block. Each line terminal block has separate compartments for each of the bus bars and their wire receiving terminals 68. Each compartment has a floor for supporting the bus bars in which there is a recess 73 which accommodates the screw 69. The end walls of this line terminal block have openings 75 through which the lines pass. When the line terminal block is used in two wire arrangement the middle bus bar is omitted and the central floor not used. A metal bar 77 secured to the top of the line terminal block functions to hold a circuit breaker retaining member (not shown). In completing the assembly the terminal end block is placed against the bus bar intermediate block unit just before such unit is lowered beneath the tabs 14. The entire assembly is held in the base pan 10 by screws 20.

The single phase panelboard shown in FIGS. 10 and 14 is a split bus arrangement and has a live section 74 separated from a dead section 76 by a partition block 78 (or 72). Both partition blocks (see FIGS. 13 and 16) have supports 79 for connecting strips with wire receiving terminals 80. Both partition blocks 78 and 72 have a vertical wall 82 which corresponds in shape and function with the vertical walls 34 of the intermediate blocks. Both blocks have projections 24 which function the same as those on the intermediate blocks. Both blocks have a tongue-like projection 84 on the side facing the ground terminal block and a recess 89 on the side facing the line terminal block. These interconnect with recesses 46 and tongues 30 of the adjacent intermediate blocks for the same alinement function. Each such block has transverse walls 88 with wire receiving openings 90 to permit wires to be inserted into the wire receiving terminals 80 from either end. The principal difference between the partition block 78 and the block 72 is the positioning of the side or separating walls. In FIG. 10 the side or separating walls 92 are on the wire terminal block side to permit the dead section 76 to be connected to the wire receiving terminals 80. With this arrangement the circuit breakers for connecting the split buses are placed to live section 74. However, when it is desired to place such split bus connecting circuit breakers in the dead section 76, the partition block 72 is used which has its separating walls 94 on the ground terminal block side, thus permitting the wire receiving terminals 80 to be connected to the live section 74. The wire receiving terminals 80 are mounted on short conductive strips 86 (see FIG. 11) which are fastened to the bus bars of the section 76 (or alternately to section 74) by self-tapping screws 96 which also secure the bus bar to the intermediate block.

In FIG. 10 there is shown in broken lines a double circuit breaker 81 which functions through the single action of the interconnected double switch handles to connect or disconnect the dead section 76. One of such pairs of circuit breakers connects the upper bus bar of section 74 through wire 83 to the upper bus bar of section 76. The other of such pair connects the lower of the bus bars of section 74 through wire 85 to the lower of the bus bars of section 76.

In FIG. 12 a single pole circuit breaker 97 is diagrammatically shown in side elevation to illustrate how its hook 98 engages the rail 16 while its spring clip 99 frictionally engages a terminal pin 63 while a projection on the side of the circuit breaker rests on the vertical wall 34.

It will be evident to those skilled in the art that the essential feature of intermediate insulating blocks of two or more sizes permits the assembly of a large variety of panelboards from a small number of basic components and thus lessens the cost of the panelboards to the ultimate benefit of the public. The basic components, while possessing certain unique characteristics as herein described, may, of course, be subject to various changes and modifications without departing from the spirit of the invention or from the scope of the appended claims.

I claim:

1. A panelboard comprising a metal base member, a plurality of intermediate insulating blocks having interlocking portions for alining said blocks in a unit and each having on opposite sides thereof spaced apart projections, said base member having spaced apart tabs overlying said intermediate block projections to hold said blocks against said base, and ground and terminal blocks secured to said base and holding said intermediate blocks in position on said base therebetween, said tabs having a spacing therebetween somewhat greater than the spacing between said intermediate block projections to afford interleaving of the latter spaces between said tabs to permit insertion or withdrawal from said base of an intermediate block when one or the other of said ground and terminal blocks are removed from said base.

2. In a split-bus circuit breaker panelboard arrangement having a plurality of insulating blocks providing a multiplicity of spaces for circuit breakers, a first set of bus bars supported by a section comprising part of said blocks, a second set of bus bars supported by a second section comprising the remainder of said blocks, a partition block mounted between said two sets of bus bars and the insulating blocks on which they are mounted, wire receiving terminals mounted on said partition block and having having permanent connection to respective ones of the bus bars of one set, and a plurality of circuit breakers corresponding in number to the bus bars in a set mounted and having connection with respective ones of the bus bars of the other set and according to their individual operating conditions connection and disconnecting the same from the corresponding bus bars of said one set.

References Cited in the file of this patent

UNITED STATES PATENTS

| | | |
|---|---|---|
| 2,007,174 | Benjamin | July 9, 1935 |
| 2,343,178 | Frank | Feb. 29, 1944 |
| 2,537,723 | Ward | Jan. 9, 1951 |
| 2,737,613 | Morris | Mar. 6, 1956 |
| 2,739,272 | Norden | Mar. 20, 1956 |
| 2,897,410 | Hammerly | July 28, 1959 |
| 2,902,632 | Stanback | Sept. 1, 1959 |
| 2,910,630 | Hammerly | Oct. 27, 1959 |
| 2,914,708 | Edmunds | Nov. 24, 1959 |
| 2,934,679 | Johnson | Apr. 26, 1960 |
| 3,005,934 | Vogelsberg | Oct. 24, 1961 |